United States Patent
Damnjanovic et al.

(10) Patent No.: US 12,241,995 B2
(45) Date of Patent: Mar. 4, 2025

(54) METHODS AND APPARATUS FOR OPERATING ANTENNAS IN THE PRESENCE OF AIRBORNE RADAR SIGNALS

(71) Applicant: QUALCOMM Incorporated, San Diego, CA (US)

(72) Inventors: Aleksandar Damnjanovic, Del Mar, CA (US); Krishna Kiran Mukkavilli, San Diego, CA (US); Rajat Prakash, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 564 days.

(21) Appl. No.: 17/711,721

(22) Filed: Apr. 1, 2022

(65) Prior Publication Data

US 2023/0314561 A1    Oct. 5, 2023

(51) Int. Cl.
| | |
|---|---|
| *G01S 7/295* | (2006.01) |
| *G01S 7/40* | (2006.01) |
| *G01S 13/72* | (2006.01) |
| *H04W 74/0833* | (2024.01) |

(52) U.S. Cl.
CPC .......... *G01S 7/2955* (2013.01); *G01S 7/4021* (2013.01); *G01S 13/726* (2013.01); *H04W 74/085* (2013.01)

(58) Field of Classification Search
CPC .... G01S 7/2955; G01S 7/4021; G01S 13/726; H04W 74/085
USPC .......................................................... 370/329
See application file for complete search history.

(56) References Cited

U.S. PATENT DOCUMENTS

| | | | |
|---|---|---|---|
| 2016/0047883 A1* | 2/2016 | Baker | G01S 5/0273 |
| | | | 342/126 |
| 2016/0381563 A1* | 12/2016 | Khalek | H04W 16/14 |
| | | | 455/454 |
| 2022/0291336 A1* | 9/2022 | McClellan | G01S 7/38 |

* cited by examiner

*Primary Examiner* — Faisal Choudhury
(74) *Attorney, Agent, or Firm* — ArentFox Schiff LLP

(57) ABSTRACT

Aspects of the present disclosure include methods, apparatuses, and computer readable media for identifying a plurality of radar signals including a first radar signal during a first interval and a second radar signal during a second interval, identifying a first subinterval within the first interval, identifying a second subinterval within the second interval, refraining from transmitting downlink information during the first subinterval, and transmitting the downlink information during the second subinterval.

30 Claims, 8 Drawing Sheets

METHODS AND APPARATUS FOR OPERATING ANTENNAS IN THE PRESENCE OF AIRBORNE RADAR SIGNALS

BACKGROUND

Aspects of the present disclosure relate generally to wireless communications, and more particularly, to apparatuses and methods for operating antennas in the presence of airborne radar signals.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, NR technology includes transmitting wireless signals via beamforming. Such transmissions may allow for higher data rate (as compared to previous technologies). However, wireless transmission may interfere with radar operations. For example, an airplane may transmit radar signals to detect terrain, obstructions, and/or other aircrafts that may interfere with the operation and/or safety of the airplane. The airplane may transmit radar signals and receive reflected signals. Based on the transmitted radar signals and the reflected signals, the airplane may be able to ascertain information relating terrain, obstructions, and/or other aircrafts. The wireless transmission associated with NR may interfere with the reception of the reflected signals. Therefore, improvements may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods by a base station (BS) for identifying a plurality of radar signals including a first radar signal during a first interval and a second radar signal during a second interval, identifying a first subinterval within the first interval, identifying a second subinterval within the second interval, refraining from transmitting downlink information during the first subinterval, and transmitting the downlink information during the second subinterval.

Other aspects of the present disclosure include a base station (BS) having a memory comprising instructions, a transceiver, and one or more processors operatively coupled with the memory and the transceiver, the one or more processors configured to execute instructions in the memory to identify a plurality of radar signals including a first radar signal during a first interval and a second radar signal during a second interval, identify a first subinterval within the first interval, identify a second subinterval within the second interval, refrain from transmitting downlink information during the first subinterval, and transmit the downlink information during the second subinterval.

An aspect of the present disclosure includes a base station (BS) including means for identifying a plurality of radar signals including a first radar signal during a first interval and a second radar signal during a second interval, means for identifying a first subinterval within the first interval, means for identifying a second subinterval within the second interval, means for refraining from transmitting downlink information during the first subinterval, and means for transmitting the downlink information during the second subinterval.

Some aspects of the present disclosure include non-transitory computer readable media having instructions stored therein that, when executed by one or more processors of a base station (BS), cause the one or more processors to identify a plurality of radar signals including a first radar signal during a first interval and a second radar signal during a second interval, identify a first subinterval within the first interval, identify a second subinterval within the second interval, refrain from transmitting downlink information during the first subinterval, and transmit the downlink information during the second subinterval.

Aspects of the present disclosure include methods for receiving radar information including a first radar signal transmitted by a radar transmitter during a first interval and a second radar signal transmitted by the radar transmitter during a second interval, receiving an indication to refrain from transmitting uplink information during a first subinterval within the first interval and to transmit the uplink information during a second subinterval within the second interval, refraining from transmitting the uplink information during the first subinterval, and transmitting the uplink information during the second subinterval.

Other aspects of the present disclosure include a base station (BS) having a memory comprising instructions, a transceiver, and one or more processors operatively coupled with the memory and the transceiver, the one or more processors configured to execute instructions in the memory to receive radar information including a first radar signal transmitted by a radar transmitter during a first interval and a second radar signal transmitted by the radar transmitter during a second interval, receive an indication to refrain from transmitting uplink information during a first subinterval within the first interval and to transmit the uplink information during a second subinterval within the second interval, refrain from transmitting the uplink information during the first subinterval, and transmit the uplink information during the second subinterval.

An aspect of the present disclosure includes a base station (BS) including means for receiving radar information including a first radar signal transmitted by a radar transmitter during a first interval and a second radar signal transmitted by the radar transmitter during a second interval, means for receiving an indication to refrain from transmitting uplink information during a first subinterval within the first interval and to transmit the uplink information during a second subinterval within the second interval, means for refraining from transmitting the uplink information during the first subinterval, and means for transmitting the uplink information during the second subinterval.

Some aspects of the present disclosure include non-transitory computer readable media having instructions stored therein that, when executed by one or more processors of a base station (BS), cause the one or more processors to receive radar information including a first radar signal transmitted by a radar transmitter during a first interval and a second radar signal transmitted by the radar transmitter during a second interval, receive an indication to refrain from transmitting uplink information during a first subinterval within the first interval and to transmit the uplink information during a second subinterval within the second interval, refrain from transmitting the uplink information during the first subinterval, and transmit the uplink information during the second subinterval.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
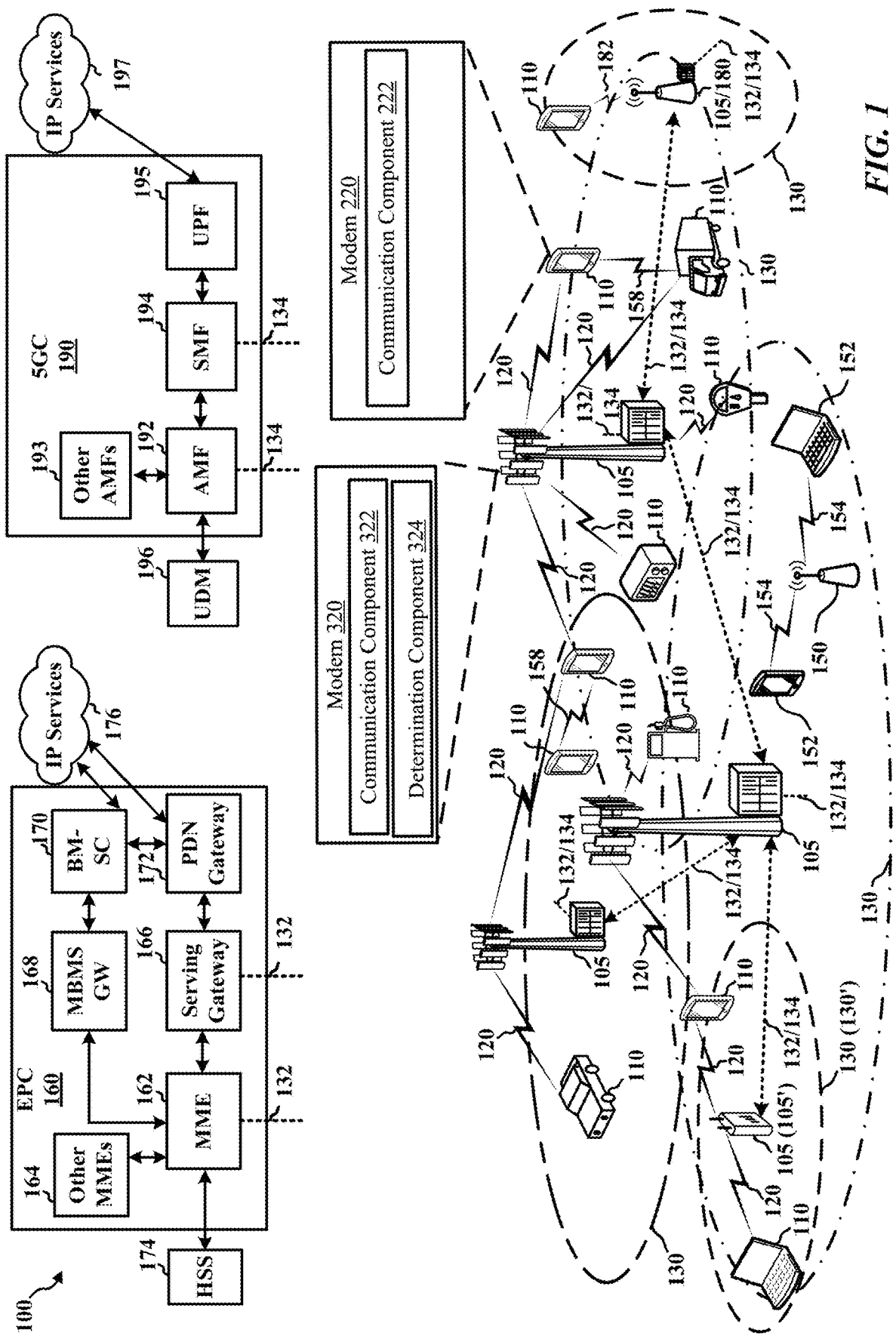
FIG. 1 is a diagram illustrating an example of a wireless communications system and an access network according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In some instances, spectrum may be important for the success of wireless systems. Examples of the spectrum may include licensed spectrum, unlicensed spectrum, and/or shared spectrum. Some aspects may include efficient and/or dynamic sharing to adequately protect incumbents, while improving access for new users. Sensing and/or measurements by network nodes and/or devices may be considered. Incumbent users may provide interference measurements, with or without assistance by cloud server/database.

In one implementation, airborne radars are used by aircrafts to navigate through terrains and/or other obstructions. The radar "beam" may scan in both horizontal (azimuth) and vertical (elevation) directions with a horizontal scan rate of 36 degrees/second, resulting in a 10 second intervalicity for 360-degree coverage. Using an overlay of ½ the beam width of 1.2 degrees, 600 scans may require 10 seconds to cover 360 degrees. A full 360 degree scan may result in a dwell time of 16.7 milliseconds (ms) at each azimuth scanning angle. Similarly, vertical scanning of +/−60 degrees may be expected at each azimuthal scanning angle. Using an overlay of ½ the beam width of 6 degrees, 40 scans may be required to be completed within the 16.7 ms dwell time. This would indicate that each scan may be completed on the order of 417 microseconds ($\mu s$). The pulse waveform used for scanning may be Q7N, implying a sequence of frequency hopped or chirped pulses. The pulse width may be 1.25 $\mu s$ with a 5% duty cycle and a 2 kilohertz (kHz) pulse repetition frequency.

During the operation of an airborne radar, wireless communication signals (e.g., the main beam or sidelobe) transmitted by a base station (BS) and/or a user equipment (UE) may interfere with the airborne radar. Conversely, radar signals transmitted by the airborne radar may interfere with the operations of the wireless communication of the BS and/or the UE. Therefore, it may be desirable to reduce the interference between airborne radars and wireless communications to improve flight safety.

In some aspects of the present disclosure, an approach for the coexistence of wireless communication (e.g., 5G or 6G) and radar may include relying on the BS to reduce interference. The BS may consider UE and/or radar assistance. The BS may implement interference threshold-based methods (including optionally aggregating interference levels) and/or beam-time based interference management. Some aspects of the present disclosure may account for main beam and/or sidelobe occurrences, including predicting beam occurrences with or without assistance from the airborne radar. The radar may cause interference to the network. Some aspects of the present disclosure may account for radar range capability. For example, higher interference threshold for long range radar detection may lead to higher degradation for objects far away. Lower interference threshold for short range radar detection may lead to lower degradation for objects nearby.

In some aspects of the present disclosure, the network may track the timing of the radar signal and adjusts the timing of the network, resulting in a timing drift of 0.2 ppm or less (assumes 1,500 miles per hour (mph) airplane speed). In a first aspect, the network may estimate airborne radar distance to one or more base stations based on the measurements from some or all of the base stations. Based on the periodicity of the radar signal transmission and/or silent periods, the network may adjust the transmission activity of the network. Timing of the network signals may be synchronized so that signals arrive at the radar at approximately the same time as reflections from the objects far away (e.g., 1 kilometer (km), 10 km, 100 km . . . ). For example, for the scenario where periodicity of radar signals is equal to 500 $\mu s$, a 50% duty cycle of the radar may be accommodated with a 250 $\mu s$ transmission (e.g., mini) slot duration. As such, the impacted radar range for scanning may be from approximately 32 km to approximately 72 km, and then approximately 108 km to approximately 144 km, etc. Degradation may be limited if the main beam is avoided and if radar frequency is avoided. Synchronized 25% duty cycle for the network may allow undisturbed radar signal for every other scan.

In another aspect of the present disclosure, the network may configure limited duty cycle operation in order to avoid interference from the network to the airborne radar.

In certain aspects, any configured transmission that falls into a restricted region may be suspended.

In some aspects, beam-time approach may be implemented for beam management of the main beam. Prediction of the main beam occurrence may be required to avoid transmission when in the coverage of the main beam. Inter-network coordination or intra-network coordination may assist with the prediction. Aspects of the present disclosure may include exploiting predicted scanning pattern and/or ½ beamwidth overlap.

In certain aspects of the present disclosure, the UE may be configured to perform measurements for the detection of radar signals. If occurrence of the main-beam and/or sidelobe can be predicted, and if frequency hopping pattern can be predicted, further radar protection can be achieved by frequency selective scheduling. After certain distance from the airborne radar (approximately 30-50 km), interference from the network (e.g., a single UE) to the radar may be below radar receiver sensitivity. If the BS and/or the UE are located indoor, they may be isolated from the radar. Aspects of the present disclosure may include introducing procedures for the network to determine if the locations of the BS and/or UE permit less restricted mode of operation. Such schemes may be applicable to the sidelobe and/or the main-beam.

In certain aspects of the present disclosure, network signals may interfere with more than one radar. Overhand signals and/or channel signals may be transmitted when radar signals are not present. In some instances, even outside the main beam, the radar signal may be strong (above a certain threshold). Waveforms may be designed and/or configured such that the overhead signals do not to overlap with the radar pulses. Slot duration and/or mini-slot durations (e.g., 250 $\mu s$ or less) may be desirable. In some cases, the slots may be able to accommodate the require synchronization signal blocks. The UEs may be aware of orthogonal frequency division multiplexing (OFDM) symbols not corrupted by radar signals to utilize for Automatic Gain Control (AGC). Rate matching may account for possible puncturing of OFDM symbols. The BS may signal to the UE one or more OFDM symbol locations possibly impacted by interference signals and/or the UE may be capable of detecting radar interference. In some aspects, the UE may puncture certain resource elements (e.g., the OFDM symbols impacted by interference signals). If radar signals from multiple airborne radars are impacting the communication between the BS and the UE, redundant location of the overhead signals may be desirable.

In one aspect of the present disclosure, the network may signal to the UE time occasions when radar interference is expected to be above a certain threshold. The network waveform may be rate matched around radar signals.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222 configured to communicate with the BS 105 via a cellular network, a Wi-Fi network, or other wireless and wired networks. In some implementations, the communication component 222 may be implemented using hardware, software, or a combination of hardware and software. In some implementations, the BS 105 may include a communication component 322 configured to communicate with the UE 110. The BS 105 may include a determination component 324 configured to identify a number and/or a waveform of radar signals. In some implementations, the communication component 322 and/or the determination component 324 may be implemented using hardware, software, or a combination of hardware and software.

A BS 105 configured for 4G Long-Term Evolution (LTE) (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
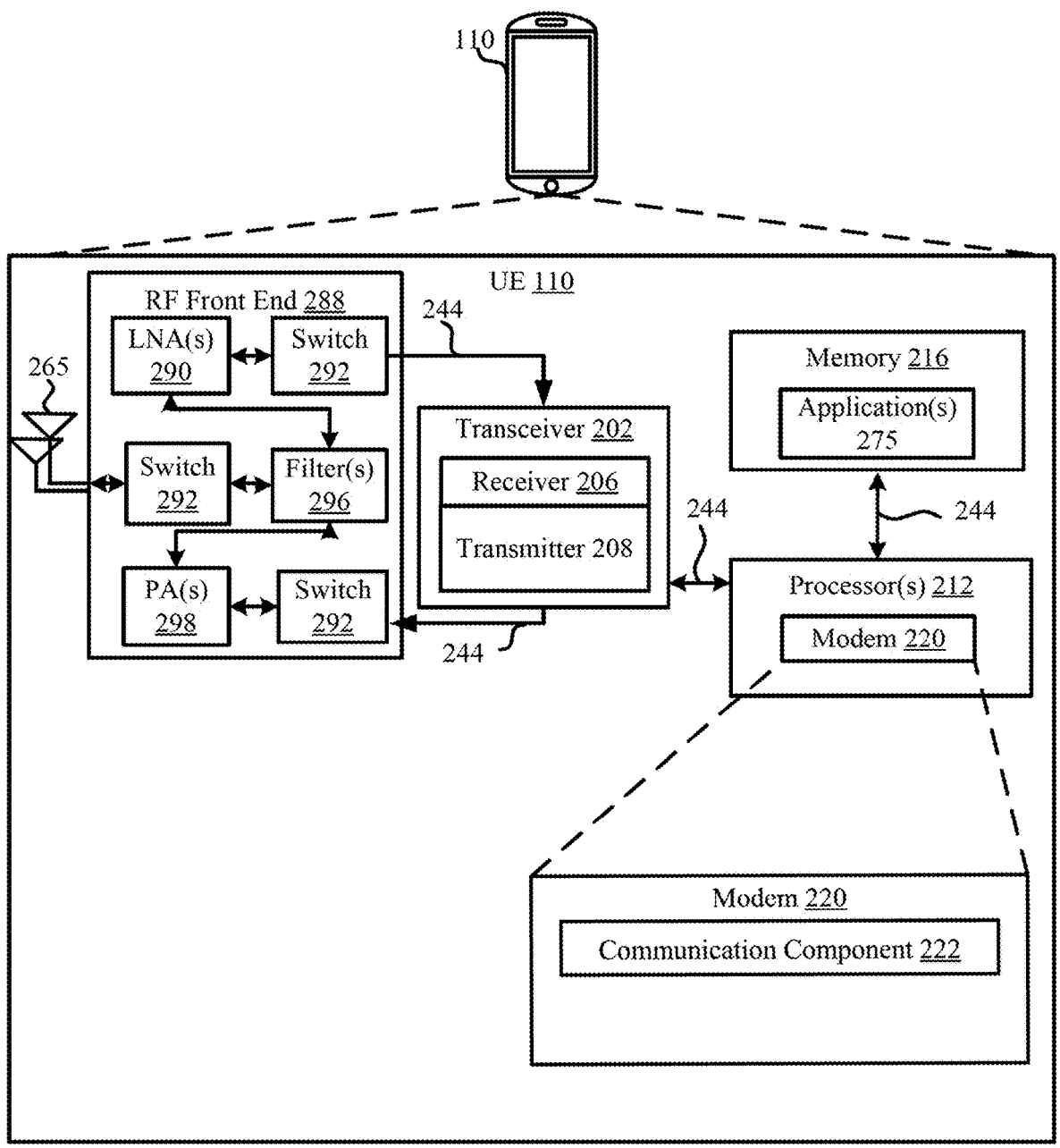
FIG. 2 is a schematic diagram of an example of a user equipment according to aspects of the present disclosure.

Referring to FIG. 2, one example of an implementation of the UE 110 may include a modem 220 having the communication component 222. In one implementation, the UE 110 may include a communication component 222 configured to communicate with the BS 105 via a cellular network, a Wi-Fi network, or other wireless and wired networks.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

The memory 216 may be configured to store data used and/or local versions of application 275. Also, the memory 216 may be configured to store data used herein and/or local versions of the communication component 222, and/or one or more of the subcomponents being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222, and/or one or more of the subcomponents, and/or data associated therewith, when UE 110 is operating at least one processor 212 to execute the communication component 222, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
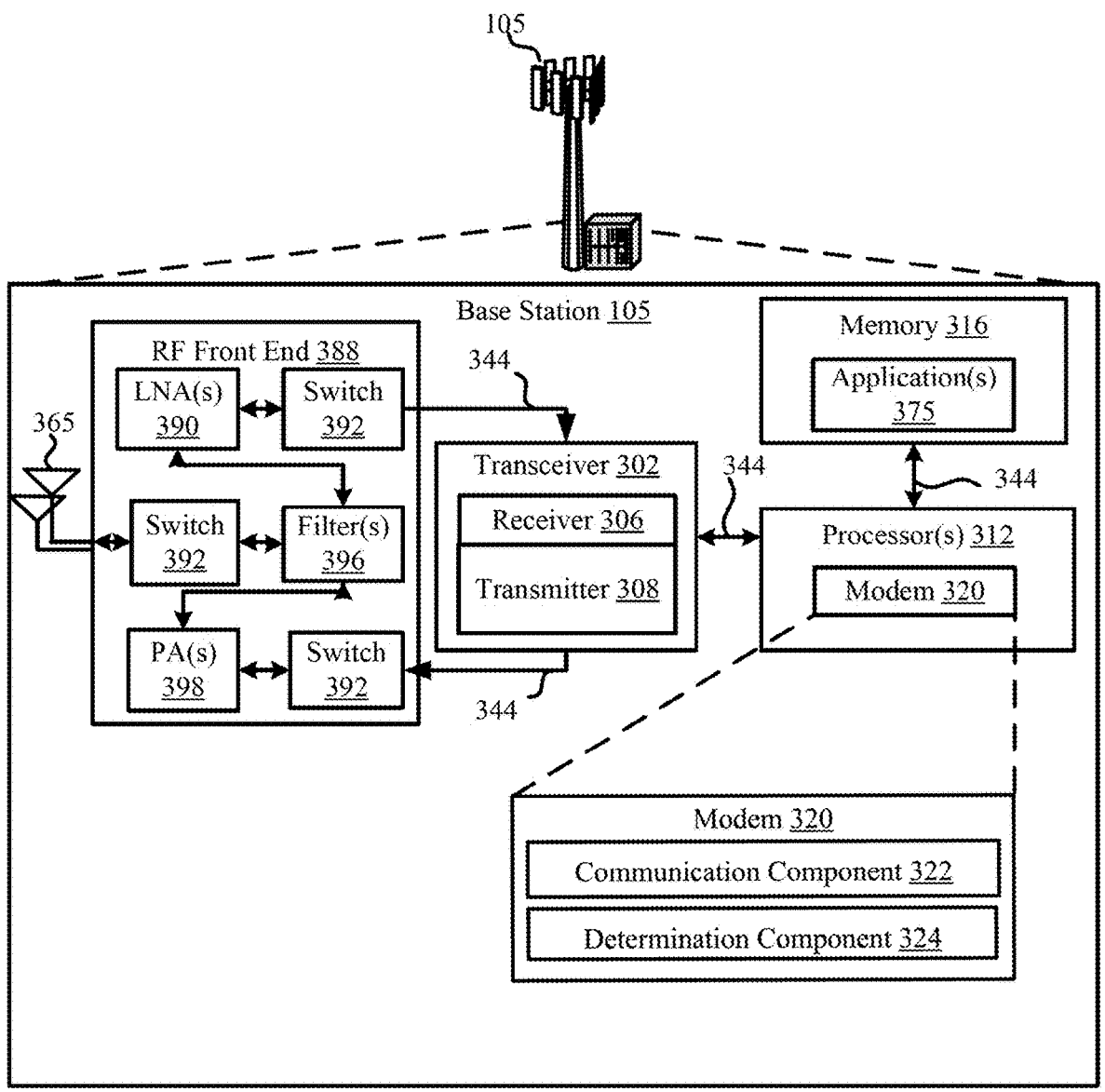
FIG. 3 is a schematic diagram of an example of a base station according to aspects of the present disclosure.

Referring to FIG. 3, one example of an implementation of the BS 105 may include a modem 320 having the communication component 322 and/or the determination component 324. In some implementations, the BS 105 may include a communication component 322 configured to communicate with the UE 110. The BS 105 may include a determination component 324 configured to identify a number and/or a waveform of radar signals.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 and/or the determination component 324 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

The memory 316 may be configured to store data used herein and/or local versions of applications 375. Also, the memory 316 may be configured to store data used herein and/or local versions of the communication component 322 and/or the determination component 324, and/or one or more of the subcomponents being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322 and/or the determination component 324, and/or one or more of the subcomponents, and/or data associated therewith, when the BS 105 is operating at least one processor 312 to execute the communication component 322 and/or the determination component 324, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
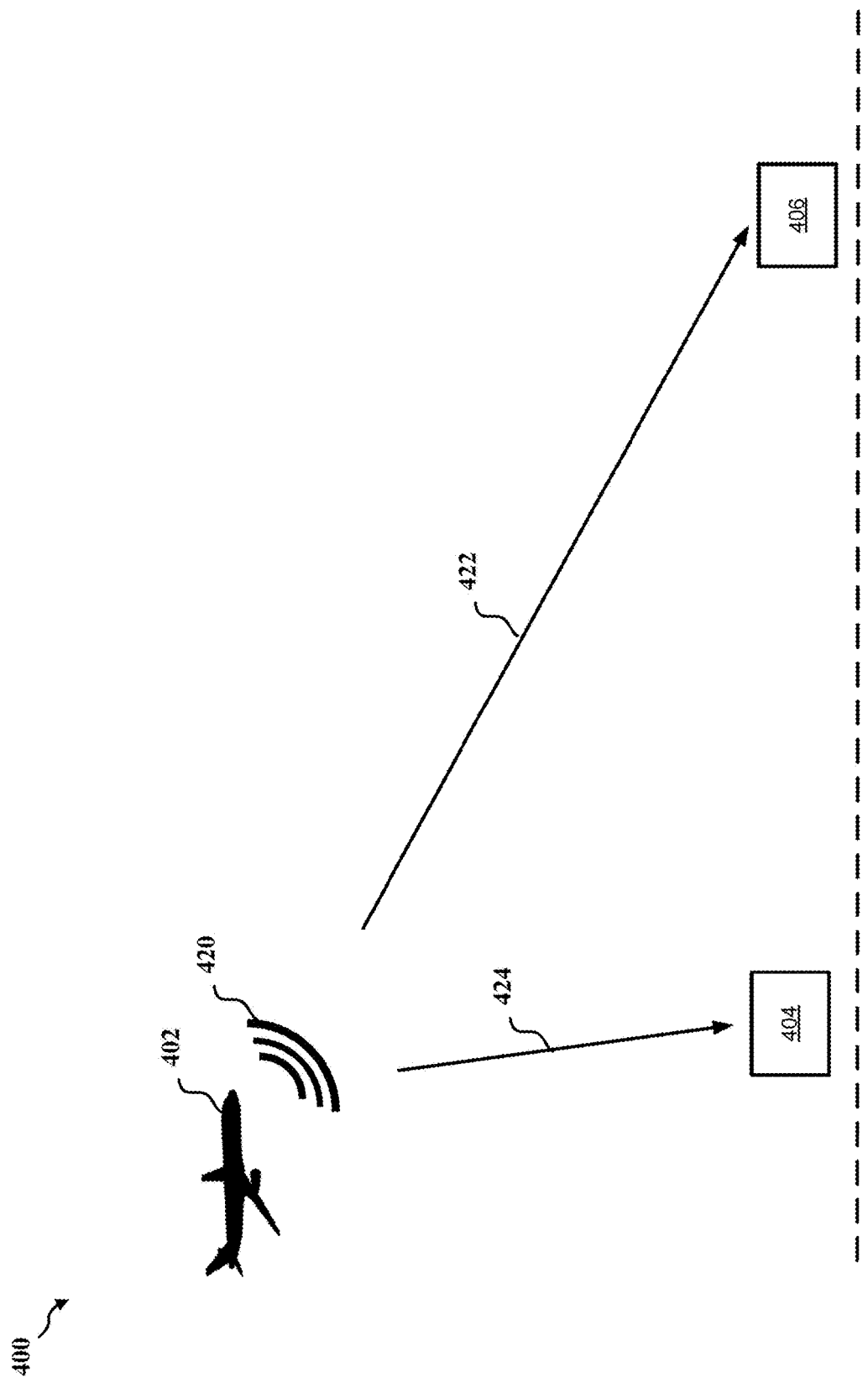
FIG. 4 illustrates an example of an environment for operating antennas in the presence of airborne radars according to aspects of the present disclosure.

FIG. 4 illustrates an example of an environment for operating antennas in the presence of airborne radars. The environment 400 may include an aircraft 402. The environment 400 may include one or more of a first wireless device 404 and/or a second wireless device 406. In some aspects of the present disclosure, the aircraft 402 may transmit radar signals 420 having a main beam 422 and one or more sidelobe 424.

In one example, the aircraft 402 may be flying at a height of 9 km and implementing a 60 degree scan. The first wireless device 404 may be a UE and the second wireless device 406 may be a UE. The first wireless device 404 may be below the aircraft 402. The second wireless device 406 may be 5.2 km from the first wireless device 404. The strength of the main beam 422 of the radar signals 420 of the aircraft 402 may be 130 decibel milliwatts (dBm) (1 megawatt (MW)+40 decibel relative to isotropic (dBi)). The strength of the one or more sidelobes 424 of the radar signals 420 of the aircraft 402 may be 80 dBm. The radar may have a reception thermal noise of −114 dBm at 1 megahertz (MHz), a reception noise floor of −110 dBm, and/or a reception sensitivity of −120 dBm. The free path loss between the aircraft 402 and the first wireless device 404 may be 121.1 decibel (dB). The free path loss between the aircraft 402 and the second wireless device 406 may be 122 dB. The first wireless device 404 may have a transmission power of 23 dBm (omni-direction). Therefore, the strength of transmission signal from the first wireless device 404 as measured at the aircraft 402 may be −108 dBm (23−121±10). The second wireless device 406 may have a transmission power of 23 dBm (omni-direction). Therefore, the strength of transmission signal from the second wireless device 406 as measured at the aircraft 402 may be −59 dBm (23−122+40). The strength of the radar signals 402 as measured by the first wireless device 404 and the second wireless device 406 may be −41 dBm and +8 dBm, respectively.

In another example, the aircraft 402 may be flying at a height of 9 km and implementing a 60 degree scan. The first wireless device 404 may be a BS and the second wireless device 406 may be a BS. The first wireless device 404 may be below the aircraft 402. The strength of the main beam 422 of the radar signals 420 of the aircraft 402 may be 130 dBm (1 MW+40 dBi). The strength of the one or more sidelobes 424 of the radar signals 420 of the aircraft 402 may be 80 dBm. The radar may have a reception thermal noise of −114 dBm at 1 MHz, a reception noise floor of −110 dBm, and/or a reception sensitivity of −120 dBm. The free path loss between the aircraft 402 and the first wireless device 404 may be 121 dB. The free path loss between the aircraft 402 and the second wireless device 406 may be 122 dB. The first wireless device 404 may have a transmission power of 47 dBm (omni-direction). Therefore, the strength of transmission signal from the first wireless device 404 as measured at the aircraft 402 may be −104 dBm (47−20−122−10). The second wireless device 406 may have a transmission power of 47 dBm (omni-direction). Therefore, the strength of transmission signal from the second wireless device 406 as measured at the aircraft 402 may be −55 dBm (47−20−122+40). The strength of the radar signals 402 as measured at the first wireless device 404 and the second wireless device 406 may be −61 dBm and −12 dBm, respectively.

In yet another example, the aircraft 402 may be flying at a height of 9 km. The aircraft 402 may be far from the first wireless device 404 and the second wireless device 406 (e.g., 100 km away, 200 km away, 300 km away, or more). In one aspect, the aircraft 402 may be 339 km away from the first wireless device 404 and/or the second wireless device 406. The aircraft 402 may travel at 500 miles per hour (mph), 1000 mph, 1500 mph, or other speeds. The first wireless device 404 may be a UE and the second wireless device 406 may be a UE. The strength of the main beam 422 of the radar signals 420 of the aircraft 402 may be 130 dBm (1 MW+40 dBi). The strength of the one or more sidelobes 424 of the radar signals 420 of the aircraft 402 may be 80 dBm. The free path loss may be 152.6 dB. The main beam coverage at 339 km may be approximately 50 km. The first wireless device 404 may have a transmission power of 23 dBm (omni-direction). Therefore, the strength of transmission signal from the first wireless device 404 as measured at the aircraft 402 may be −140 dBm (23−153−10). The second wireless device 406 may have a transmission power of 23 dBm (omni-direction). Therefore, the strength of transmission signal from the second wireless device 406 as measured at the aircraft 402 may be −90 dBm (23−153+40). The strength of the radar signals 402 as measured by the first wireless device 404 and the second wireless device 406 may be −73 dBm and −23 dBm, respectively.

Figure 5:
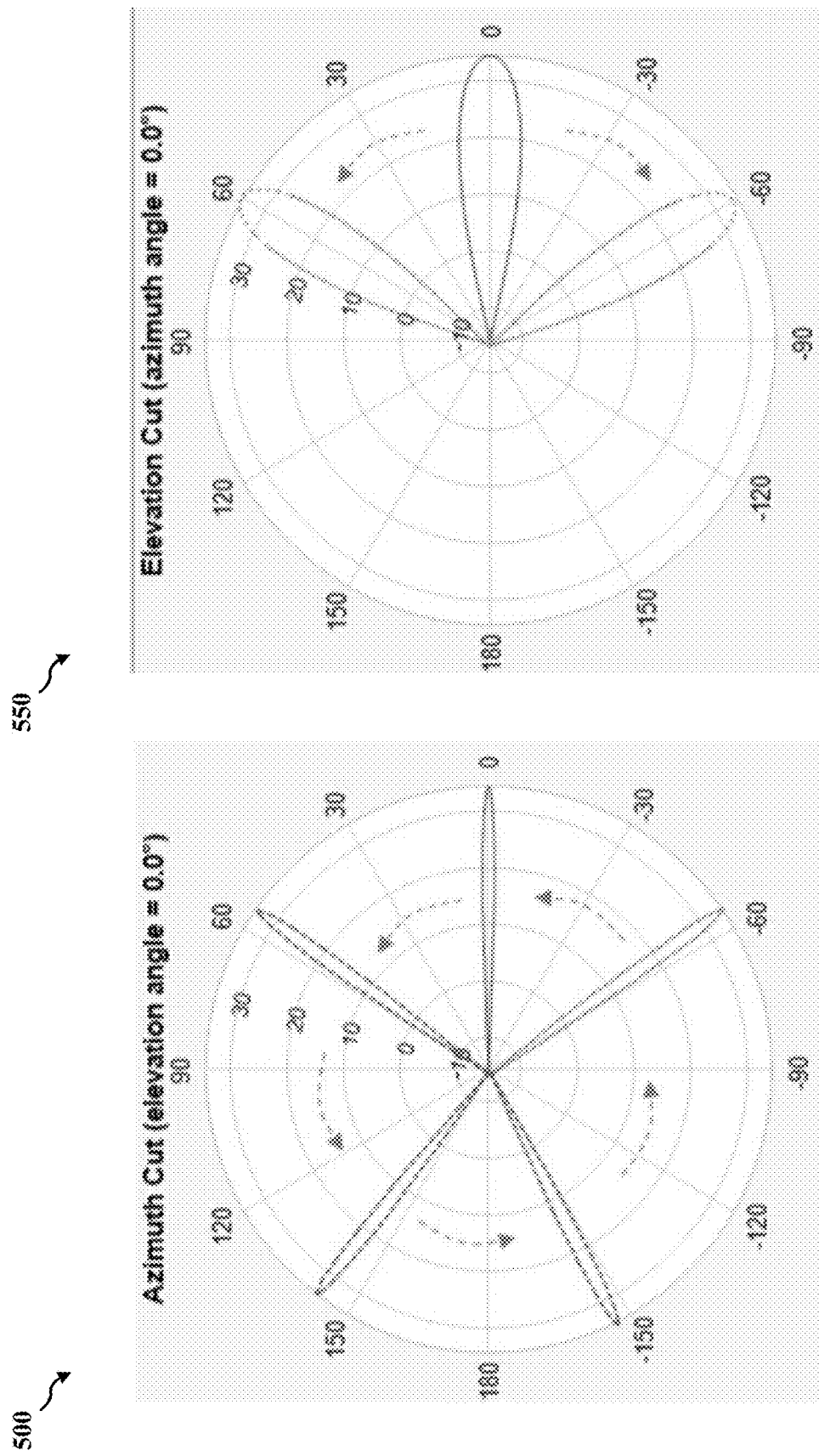
FIG. 5 illustrates examples of radar coverage according to aspects of the present disclosure.

FIG. 5 illustrates examples of radar coverage. A diagram 500 illustrates the azimuth cut of the radar signals at an elevation angle of 0°. The diagram 500 indicate the angles of the radar signals as the radar sweeps horizontally. A diagram 550 illustrates the elevation cut of the radar signals at an azimuth angle of 0°. The diagram 550 indicates the angles of the radar signals as the radar sweeps vertically.

Figure 6:
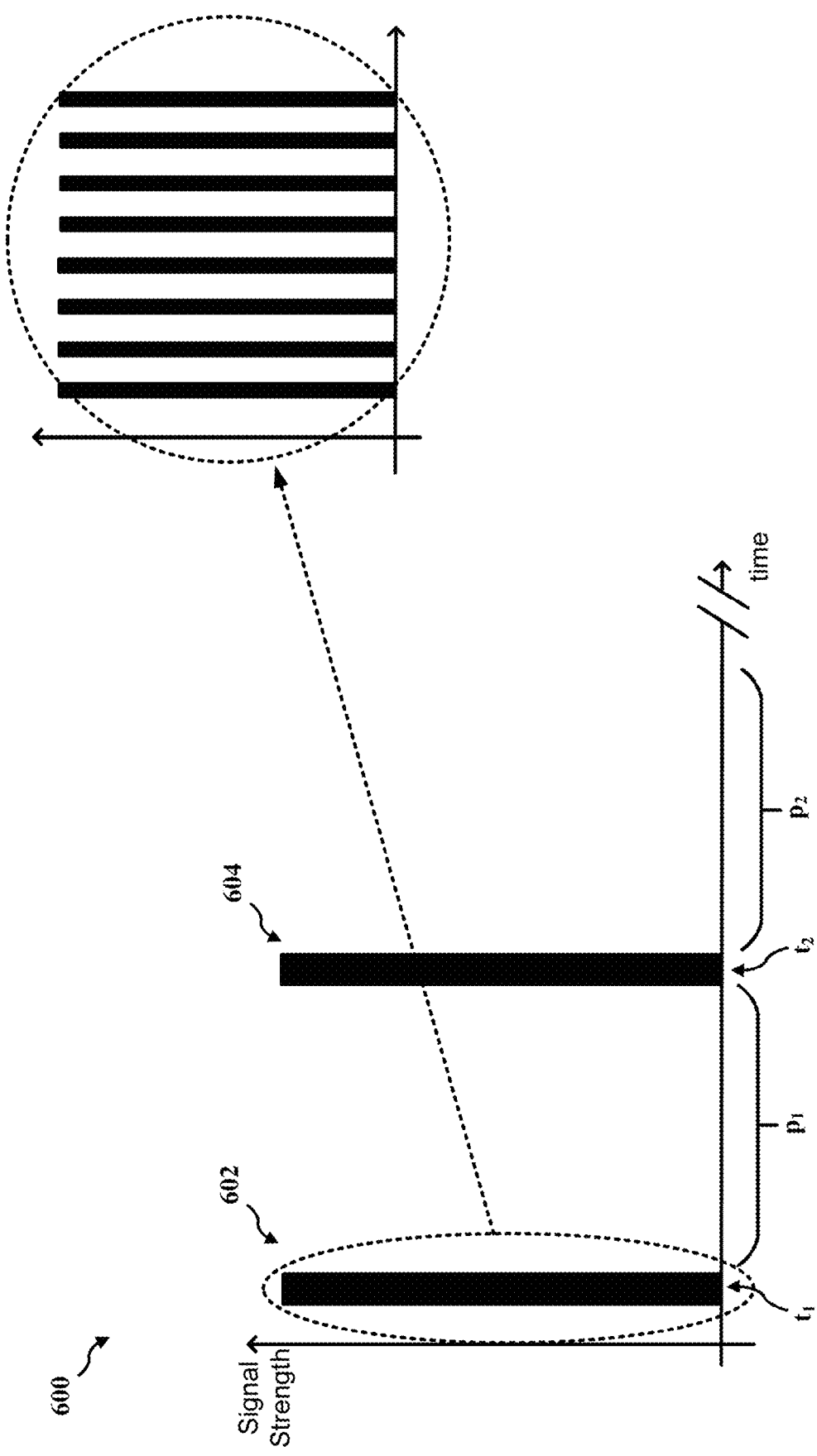
FIG. 6 illustrates an example of a scheme for operating antennas for wireless communication according to aspects of the present disclosure.

FIG. 6 illustrates an example of a scheme for operating antennas for wireless communication. Referring to FIGS. 4 and 6, a radar, such as the radar of the aircraft 402, may transmit a first plurality of radar signals 602. The first plurality of radar signals 602 may be transmitted at a first time $t_1$. The radar may not transmit any signals for a first interval of $p_1$. During the first interval $p_1$, the radar may receive, and/or expect to receive, reflected signals based on the first plurality of radar signals 602. Based on the reflected signals, the aircraft 402 may determine the terrain, obstructions, and/or other aircrafts. The radar of the aircraft 402 may transmit a second plurality of radar signals 604. The second plurality of radar signals 604 may be transmitted at a second time $t_2$. The radar may not transmit any signals for a second interval of $p_2$. During the second interval $p_2$, the radar may receive, and/or expect to receive, reflected signals based on the second plurality of radar signals 604.

In one aspect of the present disclosure, one or more wireless devices, such as the BS 105 and/or the UE 110, may transmit downlink (DL) and/or uplink signals (UL) information during the first interval $p_1$, or a portion of the first interval. The one or more wireless devices may refrain from transmitting DL and/or UL information during the second interval $p_2$. As such, the one or more wireless devices may not interfere with the operation of the radar of the aircraft 402 during the second interval $p_2$.

In some aspects, the first interval $p_1$ and the second interval $p_2$ may be the same or different.

Figure 7:
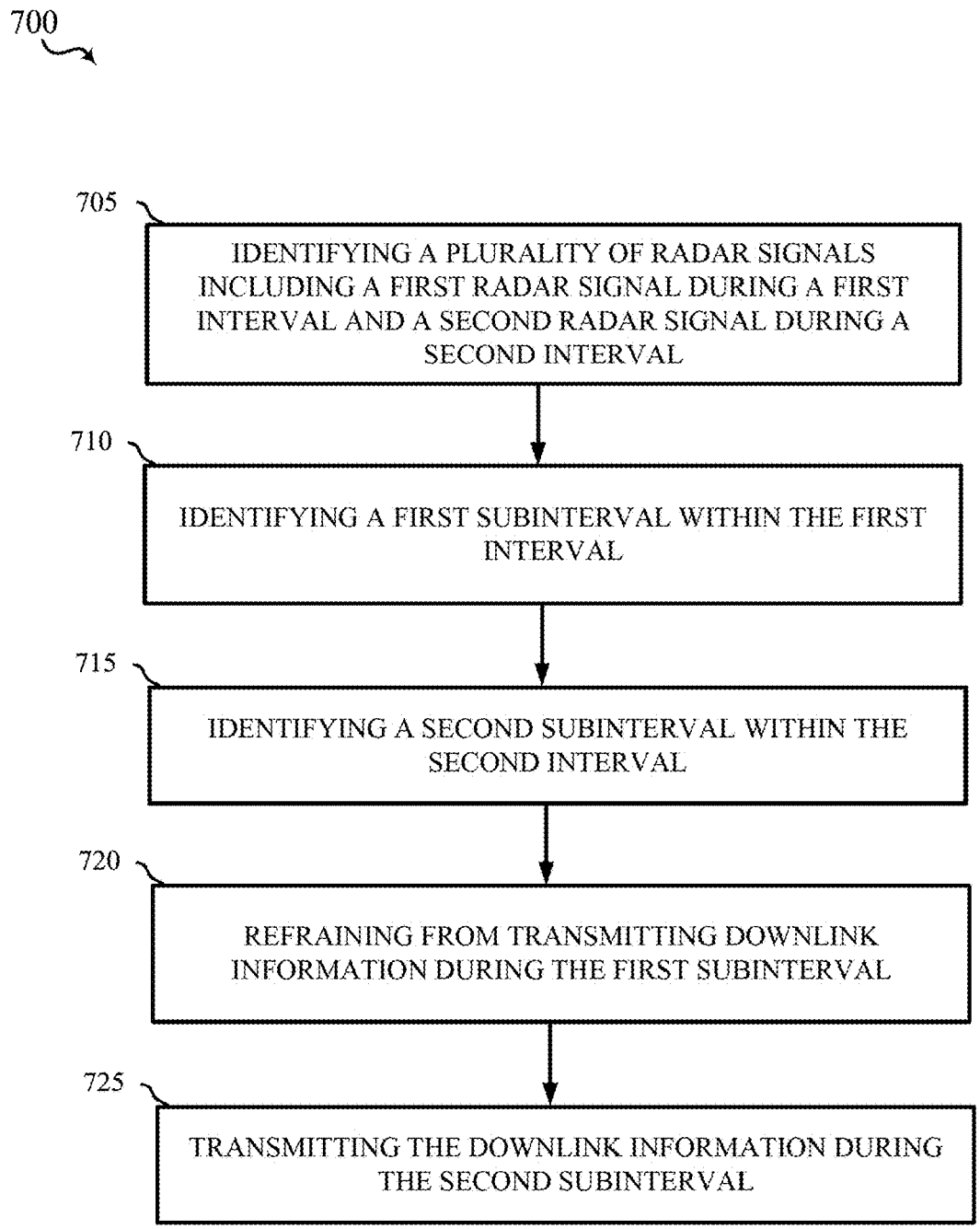
FIG. 7 illustrates an example of a method for operating antennas by a base station according to aspects of the present disclosure.

FIG. 7 illustrates an example of a method for operating antennas by a base station. For example, a method 700 may be performed by the one or more of the processor 312, the memory 316, the applications 375, the modem 320, the transceiver 302, the receiver 306, the transmitter 308, the RF front end 388, the communication component 322 and/or the determination component 324, and/or one or more other components of the BS 105 in the wireless communication network 100.

At block 705, the method 700 may identify a plurality of radar signals including a first radar signal during a first interval and a second radar signal during a second interval. For example, the determination component 324, the processor 312, the memory 316, the modem 320, and/or the applications 375 of the BS 105 may identify a plurality of radar signals including a first radar signal during a first interval and a second radar signal during a second interval as described above.

In certain implementations, the determination component 324, the processor 312, the memory 316, the modem 320, and/or the applications 375 may be configured to and/or may define means for identifying a plurality of radar signals including a first radar signal during a first interval and a second radar signal during a second interval.

At block 710, the method 700 may identify a first subinterval within the first interval. For example, the determination component 324, the processor 312, the memory 316, the modem 320, and/or the applications 375 of the BS 105 may identify a first subinterval within the first interval as described above.

In certain implementations, the determination component 324, the processor 312, the memory 316, the modem 320, and/or the applications 375 may be configured to and/or may define means for identifying a first subinterval within the first interval.

At block 715, the method 700 may identify a second subinterval within the second interval. For example, the determination component 324, the processor 312, the memory 316, the modem 320, and/or the applications 375 of the BS 105 may identify a second subinterval within the second interval.

In certain implementations, the determination component 324, the processor 312, the memory 316, the modem 320, and/or the applications 375 may be configured to and/or may define means for identifying a second subinterval within the second interval.

At block 720, the method 700 may refrain from transmitting downlink information during the first subinterval. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may refrain from transmitting downlink information during the first subinterval as described above.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for refraining from transmitting downlink information during the first subinterval.

At block 725, the method 700 may transmit the downlink information during the second subinterval. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit the downlink information during the second subinterval as described above. For example, the communication component 322 may send the digital signals to the transceiver 302 or the transmitter 308. The transceiver 302 or the transmitter 308 may convert the digital signals to electrical signals and send to the RF front end 388. The RF front end 388 may filter and/or amplify the electrical signals. The RF front end 388 may send the electrical signals as electro-magnetic signals via the one or more antennas 365.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting the downlink information during the second subinterval.

Alternatively or additionally, the method 700 may further include the method above, wherein identifying the plurality of radar signals comprises detecting the plurality of radar signals at the BS.

Alternatively or additionally, the method 700 may further include any of the methods above, wherein identifying the plurality of radar signals comprises receiving, from another BS, radar information associated with the plurality of radar signals transmitted by a radar signal transmitter.

Alternatively or additionally, the method 700 may further include any of the methods above, wherein identifying the plurality of radar signals comprises detecting, at the BS, the plurality of radar signals transmitted by a radar transmitter, and receiving first radar information from a first BS and a second radar information from a second BS.

Alternatively or additionally, the method 700 may further include any of the methods above, further comprising calculating a distance between the BS and the radar transmitter based on the plurality of radar signals, the first radar information, and the second radar information.

Alternatively or additionally, the method 700 may further include any of the methods above, further comprising transmitting, to a neighbor BS, radar information indicating at least one of the first interval, the second interval, the first subinterval, or the second subinterval.

Alternatively or additionally, the method 700 may further include any of the methods above, further comprising transmitting, to a user equipment (UE) within a cell of the BS, an indication to refrain from transmitting uplink information during the first subinterval.

Alternatively or additionally, the method 700 may further include any of the methods above, wherein identifying the plurality of radar signals comprises receiving, from a user equipment (UE), radar information associated with the plurality of radar signals transmitted by a radar signal transmitter.

In some aspects, the one or more of the processor 312, the memory 316, the applications 375, the modem 320, the transceiver 302, the receiver 306, the transmitter 308, the RF front end 388, the communication component 322, and/or the determination component 324 may be configured to and/or define means for aspects of the present disclosure indicated above.

Figure 8:
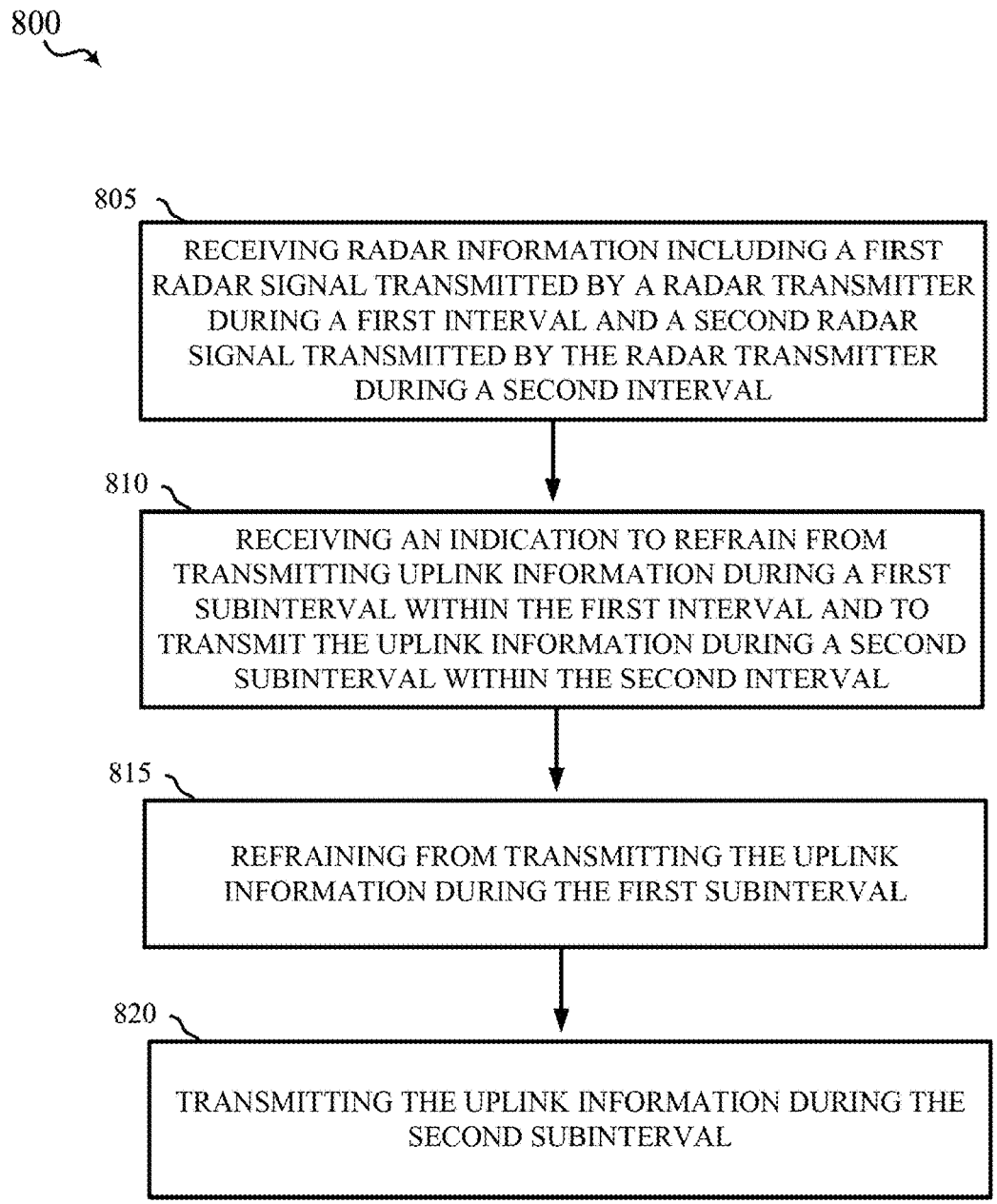
FIG. 8 illustrates an example of a method for operating antennas by a user equipment according to aspects of the present disclosure.

FIG. 8 illustrates an example of a method for operating antennas by a base station. For example, a method 800 may be performed by the one or more of the processor 212, the memory 216, the applications 275, the modem 220, the transceiver 202, the receiver 206, the transmitter 208, the RF front end 288, the communication component 222 and/or the determination component 224, and/or one or more other components of the UE 110 in the wireless communication network 100.

At block 805, the method 800 may receive radar information including a first radar signal transmitted by a radar transmitter during a first interval and a second radar signal transmitted by the radar transmitter during a second interval. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive radar information including a first radar signal transmitted by a radar transmitter during a first interval and a second radar signal transmitted by the radar transmitter during a second interval as described above.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving radar information including a first radar signal transmitted by a radar transmitter during a first interval and a second radar signal transmitted by the radar transmitter during a second interval.

At block 810, the method 800 may receive an indication to refrain from transmitting uplink information during a first subinterval within the first interval and to transmit the uplink information during a second subinterval within the second interval. For example, the communication component 222, the transceiver 202, the receiver 206, the transmitter 208, the RF front end 288, the subcomponents of the RF front end 288, the processor 212, the memory 216, the modem 220, and/or the applications 275, the processor 212, the memory 216, the modem 220, and/or the applications 275 of the UE 110 may receive an indication to refrain from transmitting uplink information during a first subinterval within the first interval and to transmit the uplink information during a second subinterval within the second interval as described above.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving an indication to refrain from transmitting uplink information during a first subinterval within the first interval and to transmit the uplink information during a second subinterval within the second interval.

At block 815, the method 800 may refrain from transmitting the uplink information during the first subinterval. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may refrain from transmitting the uplink information during the first subinterval as described above.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for refraining from transmitting the uplink information during the first subinterval.

At block 820, the method 800 may transmit the uplink information during the second subinterval. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit the uplink information during the second subinterval as described above. For example, the communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting the uplink information during the second subinterval.

Additional Implementations

Aspects of the present disclosure include methods by a base station (BS) for identifying a plurality of radar signals including a first radar signal during a first interval and a second radar signal during a second interval, identifying a first subinterval within the first interval, identifying a second subinterval within the second interval, refraining from transmitting downlink information during the first subinterval, and transmitting the downlink information during the second subinterval.

Any of the methods above, wherein identifying the plurality of radar signals comprises detecting the plurality of radar signals at the BS.

Any of the methods above, wherein identifying the plurality of radar signals comprises receiving, from another BS, radar information associated with the plurality of radar signals transmitted by a radar signal transmitter.

Any of the methods above, wherein identifying the plurality of radar signals comprises detecting, at the BS, the plurality of radar signals transmitted by a radar transmitter, and receiving first radar information from a first BS and a second radar information from a second BS.

Any of the methods above, further comprising calculating a distance between the BS and the radar transmitter based on the plurality of radar signals, the first radar information, and the second radar information.

Any of the methods above, further comprising transmitting, to a neighbor BS, radar information indicating at least one of the first interval, the second interval, the first subinterval, or the second subinterval.

Any of the methods above, further comprising transmitting, to a user equipment (UE) within a cell of the BS, an indication to refrain from transmitting uplink information during the first subinterval.

Any of the methods above, wherein identifying the plurality of radar signals comprises receiving, from a user equipment (UE), radar information associated with the plurality of radar signals transmitted by a radar signal transmitter.

Other aspects of the present disclosure include a base station (BS) having a memory comprising instructions, a transceiver, and one or more processors operatively coupled with the memory and the transceiver, the one or more processors configured to execute instructions in the memory to identify a plurality of radar signals including a first radar signal during a first interval and a second radar signal during a second interval, identify a first subinterval within the first interval, identify a second subinterval within the second interval, refrain from transmitting downlink information during the first subinterval, and transmit the downlink information during the second subinterval.

Any of the BSs above, wherein identifying the plurality of radar signals comprises detect the plurality of radar signals at the BS.

Any of the BSs above, wherein identifying the plurality of radar signals comprises receive, from another BS, radar information associated with the plurality of radar signals transmitted by a radar signal transmitter.

Any of the BSs above, wherein identifying the plurality of radar signals comprises receive, at the BS, the plurality of radar signals transmitted by a radar transmitter, and first radar information from a first BS and a second radar information from a second BS.

Any of the BSs above, wherein identifying the plurality of radar signals comprises calculate a distance between the BS and the radar transmitter based on the plurality of radar signals, the first radar information, and the second radar information.

Any of the BSs above, wherein the one or more processors are further configured to transmit, to a neighbor BS, radar information indicating at least one of the first interval, the second interval, the first subinterval, or the second subinterval.

Any of the BSs above, wherein the one or more processors are further configured to transmit, to a user equipment (UE) within a cell of the BS, an indication to refrain from transmitting uplink information during the first subinterval.

Any of the BSs above, wherein the one or more processors are further configured to receive, from a user equipment (UE), radar information associated with the plurality of radar signals transmitted by a radar signal transmitter.

An aspect of the present disclosure includes a base station (BS) including means for identifying a plurality of radar signals including a first radar signal during a first interval and a second radar signal during a second interval, means for identifying a first subinterval within the first interval, means for identifying a second subinterval within the second interval, means for refraining from transmitting downlink information during the first subinterval, and means for transmitting the downlink information during the second subinterval.

Any of the BSs above, wherein means for identifying the plurality of radar signals comprises means for detecting the plurality of radar signals at the BS.

Any of the BSs above, wherein means for identifying the plurality of radar signals comprises means for receiving, from another BS, radar information associated with the plurality of radar signals transmitted by a radar signal transmitter.

Any of the BSs above, wherein means for identifying the plurality of radar signals comprises means for detecting, at the BS, the plurality of radar signals transmitted by a radar transmitter, and receiving first radar information from a first BS and a second radar information from a second BS.

Any of the BSs above, further comprising means for calculating a distance between the BS and the radar transmitter based on the plurality of radar signals, the first radar information, and the second radar information.

Any of the BSs above, further comprising means for transmitting, to a neighbor BS, radar information indicating at least one of the first interval, the second interval, the first subinterval, or the second subinterval.

Any of the BSs above, further comprising means for transmitting, to a user equipment (UE) within a cell of the BS, an indication to refrain from transmitting uplink information during the first subinterval.

Any of the BSs above, wherein means for identifying the plurality of radar signals comprises means for receiving, from a user equipment (UE), radar information associated with the plurality of radar signals transmitted by a radar signal transmitter.

Some aspects of the present disclosure include non-transitory computer readable media having instructions stored therein that, when executed by one or more processors of a base station (BS), cause the one or more processors to identify a plurality of radar signals including a first radar signal during a first interval and a second radar signal during a second interval, identify a first subinterval within the first interval, identify a second subinterval within the second interval, refrain from transmitting downlink information during the first subinterval, and transmit the downlink information during the second subinterval.

Any of the non-transitory computer readable media above, wherein the instructions for identifying the plurality of radar signals comprises instructions, when executed by the one or more processors, cause the one or more processors to detect the plurality of radar signals at the BS.

Any of the non-transitory computer readable media above, wherein the instructions for identifying the plurality of radar signals comprises instructions, when executed by the one or more processors, cause the one or more processors to receive, from another BS, radar information associated with the plurality of radar signals transmitted by a radar signal transmitter.

Any of the non-transitory computer readable media above, wherein the instructions for identifying the plurality of radar signals comprises instructions, when executed by the one or more processors, cause the one or more processors to receive, at the BS, the plurality of radar signals transmitted by a radar transmitter, and first radar information from a first BS and a second radar information from a second BS.

Any of the non-transitory computer readable media above, further comprising instructions, when executed by the one or more processors, cause the one or more processors to calculate a distance between the BS and the radar transmitter based on the plurality of radar signals, the first radar information, and the second radar information.

Any of the non-transitory computer readable media above, further comprising instructions, when executed by the one or more processors, cause the one or more processors to transmit, to a neighbor BS, radar information indicating at least one of the first interval, the second interval, the first subinterval, or the second subinterval.

Any of the non-transitory computer readable media above, further comprising instructions, when executed by the one or more processors, cause the one or more processors to transmit, to a user equipment (UE) within a cell of the BS, an indication to refrain from transmitting uplink information during the first subinterval.

Any of the non-transitory computer readable media above, wherein the instructions for identifying the plurality of radar signals comprises instructions, when executed by the one or more processors, cause the one or more processors to receive, from a user equipment (UE), radar information associated with the plurality of radar signals transmitted by a radar signal transmitter.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 NEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a base station (BS) in a network, comprising:
    identifying a plurality of radar signals including a first radar signal during a first interval and a second radar signal during a second interval;
    identifying a first subinterval within the first interval;
    identifying a second subinterval within the second interval;
    refraining from transmitting downlink information during the first subinterval; and
    transmitting the downlink information during the second subinterval.

2. The method of claim 1, wherein identifying the plurality of radar signals comprises:
    detecting the plurality of radar signals at the BS.

3. The method of claim 1, wherein identifying the plurality of radar signals comprises:
    receiving, from another BS, radar information associated with the plurality of radar signals transmitted by a radar signal transmitter.

4. The method of claim 1, wherein identifying the plurality of radar signals comprises:
    detecting, at the BS, the plurality of radar signals transmitted by a radar transmitter; and
    receiving first radar information from a first BS and a second radar information from a second BS.

5. The method of claim 4, further comprising:
    calculating a distance between the BS and the radar transmitter based on the plurality of radar signals, the first radar information, and the second radar information.

6. The method of claim 1, further comprising:
    transmitting, to a neighbor BS, radar information indicating at least one of the first interval, the second interval, the first subinterval, or the second subinterval.

7. The method of claim 1, further comprising:
    transmitting, to a user equipment (UE) within a cell of the BS, an indication to refrain from transmitting uplink information during the first subinterval.

8. The method of claim 1, wherein identifying the plurality of radar signals comprises:
    receiving, from a user equipment (UE), radar information associated with the plurality of radar signals transmitted by a radar signal transmitter.

9. A base station (BS), comprising:
    a memory comprising instructions;
    a transceiver; and
    one or more processors operatively coupled with the memory and the transceiver, the one or more processors configured to execute instructions in the memory to:
        identify a plurality of radar signals including a first radar signal during a first interval and a second radar signal during a second interval;
        identify a first subinterval within the first interval;
        identify a second subinterval within the second interval;
        refrain from transmitting downlink information during the first subinterval; and
        transmit the downlink information during the second subinterval.

10. The BS of claim 9, wherein identifying the plurality of radar signals comprises:
    detect the plurality of radar signals at the BS.

11. The BS of claim 9, wherein identifying the plurality of radar signals comprises:
  receive, from another BS, radar information associated with the plurality of radar signals transmitted by a radar signal transmitter.

12. The BS of claim 9, wherein identifying the plurality of radar signals comprises:
  receive, at the BS, the plurality of radar signals transmitted by a radar transmitter; and first radar information from a first BS and a second radar information from a second BS.

13. The BS of claim 12, wherein identifying the plurality of radar signals comprises:
  calculate a distance between the BS and the radar transmitter based on the plurality of radar signals, the first radar information, and the second radar information.

14. The BS of claim 9, wherein the one or more processors are further configured to:
  transmit, to a neighbor BS, radar information indicating at least one of the first interval, the second interval, the first subinterval, or the second subinterval.

15. The BS of claim 9, wherein the one or more processors are further configured to:
  transmit, to a user equipment (UE) within a cell of the BS, an indication to refrain from transmitting uplink information during the first subinterval.

16. The BS of claim 9, wherein the one or more processors are further configured to:
  receive, from a user equipment (UE), radar information associated with the plurality of radar signals transmitted by a radar signal transmitter.

17. A non-transitory computer readable medium having instructions stored therein that, when executed by one or more processors of a base station (BS), cause the one or more processors to:
  identify a plurality of radar signals including a first radar signal during a first interval and a second radar signal during a second interval;
  identify a first subinterval within the first interval;
  identify a second subinterval within the second interval;
  refrain from transmitting downlink information during the first subinterval; and
  transmit the downlink information during the second subinterval.

18. The non-transitory computer readable medium of claim 17, wherein the instructions for identifying the plurality of radar signals comprises instructions, when executed by the one or more processors, cause the one or more processors to:
  detect the plurality of radar signals at the BS.

19. The non-transitory computer readable medium of claim 17, wherein the instructions for identifying the plurality of radar signals comprises instructions, when executed by the one or more processors, cause the one or more processors to:
  receive, from another BS, radar information associated with the plurality of radar signals transmitted by a radar signal transmitter.

20. The non-transitory computer readable medium of claim 17, wherein the instructions for identifying the plurality of radar signals comprises instructions, when executed by the one or more processors, cause the one or more processors to:
  receive, at the BS, the plurality of radar signals transmitted by a radar transmitter; and first radar information from a first BS and a second radar information from a second BS.

21. The non-transitory computer readable medium of claim 20, further comprising instructions, when executed by the one or more processors, cause the one or more processors to:
  calculate a distance between the BS and the radar transmitter based on the plurality of radar signals, the first radar information, and the second radar information.

22. The non-transitory computer readable medium of claim 17, further comprising instructions, when executed by the one or more processors, cause the one or more processors to:
  transmit, to a neighbor BS, radar information indicating at least one of the first interval, the second interval, the first subinterval, or the second subinterval.

23. The non-transitory computer readable medium of claim 17, further comprising instructions, when executed by the one or more processors, cause the one or more processors to:
  transmit, to a user equipment (UE) within a cell of the BS, an indication to refrain from transmitting uplink information during the first subinterval.

24. The non-transitory computer readable medium of claim 17, wherein the instructions for identifying the plurality of radar signals comprises instructions, when executed by the one or more processors, cause the one or more processors to:
  receive, from a user equipment (UE), radar information associated with the plurality of radar signals transmitted by a radar signal transmitter.

25. A base station (BS), comprising:
  means for identifying a plurality of radar signals including a first radar signal during a first interval and a second radar signal during a second interval;
  means for identifying a first subinterval within the first interval;
  means for identifying a second subinterval within the second interval;
  means for refraining from transmitting downlink information during the first subinterval; and
  means for transmitting the downlink information during the second subinterval.

26. The BS of claim 25, wherein means for identifying the plurality of radar signals comprises:
  means for detecting the plurality of radar signals at the BS.

27. The BS of claim 25, wherein means for identifying the plurality of radar signals comprises:
  means for receiving, from another BS, radar information associated with the plurality of radar signals transmitted by a radar signal transmitter.

28. The BS of claim 25, wherein means for identifying the plurality of radar signals comprises:
  means for detecting, at the BS, the plurality of radar signals transmitted by a radar transmitter; and receiving first radar information from a first BS and a second radar information from a second BS.

29. The BS of claim 28, further comprising:
  means for calculating a distance between the BS and the radar transmitter based on the plurality of radar signals, the first radar information, and the second radar information.

30. The BS of claim 25, further comprising:
  means for transmitting, to a neighbor BS, radar information indicating at least one of the first interval, the second interval, the first subinterval, or the second subinterval.

* * * * *